(12) United States Patent
Arsenault et al.

(10) Patent No.: US 8,676,016 B2
(45) Date of Patent: Mar. 18, 2014

(54) COMPRESSIBLE PHOTONIC CRYSTAL

(75) Inventors: Andre Arsenault, Toronto (CA); Geoffrey Alan Ozin, Toronto (CA); Georg von Freymann, Karlsruhe (DE)

(73) Assignees: The Governing Council of the University of Toronto, Toronto, CA (US); Opalux Incorporated, Toronto, CA (US)

( * ) Notice: Subject to any disclaimer, the term of this patent is extended or adjusted under 35 U.S.C. 154(b) by 833 days.

(21) Appl. No.: 12/527,382

(22) PCT Filed: Feb. 16, 2007

(86) PCT No.: PCT/CA2007/000236
§ 371 (c)(1),
(2), (4) Date: Feb. 4, 2010

(87) PCT Pub. No.: WO2008/098339
PCT Pub. Date: Aug. 21, 2008

(65) Prior Publication Data
US 2010/0150511 A1    Jun. 17, 2010

(51) Int. Cl.
*G02B 6/10* (2006.01)
(52) U.S. Cl.
USPC .......................................................... 385/129
(58) Field of Classification Search
None
See application file for complete search history.

(56) References Cited

U.S. PATENT DOCUMENTS

| | | | |
|---|---|---|---|
| 6,261,469 B1 | 7/2001 | Zakhidov et al. | |
| 6,721,476 B2 | 4/2004 | Padmanabhan et al. | |
| 6,929,764 B2* | 8/2005 | Jiang et al. | 264/42 |
| 6,956,689 B2 | 10/2005 | Takiguchi et al. | |
| 2002/0062782 A1* | 5/2002 | Norris et al. | 117/3 |
| 2004/0062700 A1* | 4/2004 | Miguez et al. | 423/266 |
| 2004/0131799 A1* | 7/2004 | Arsenault et al. | 428/1.26 |
| 2005/0117866 A1* | 6/2005 | Park et al. | 385/129 |
| 2006/0093306 A1* | 5/2006 | Kawasaki et al. | 385/147 |
| 2010/0045027 A1* | 2/2010 | Whiteman | 283/107 |

OTHER PUBLICATIONS

K. Sumioka et al. Tuning the optical properties of inverse opal photonic crystals by deformation. Advanced Materials, 14:18:1284-1286, Sep. 2002.*

Arsenault, A.C., et al., "From Color Fingerprinting to the Control of Photoluminescence in Elastic Photonic Crystals", *Nature Materials*, vol. 5, Mar. 2006, pp. 179-184.

Reed, E.J., et al., "Reversed Doppler Effect in Photonic Crystals", *Physical review Letters*, vol. 91(13), 13, Sep. 23, 2003, pp. 133901-1 through 133901-4.

Istrate, Emanuel, et al., "Photonic Crystal Heterostructures and Interfaces", *Review of Modern Physics*, vol. 78, May 16, 2006, pp. 455-481.

Ge, Jason J., et al., "Rubbing-Induced Molecular Reorientation on an Alignment Surface of an Aromatic Polyimide Containing Cyanobiphenyl Side Chains", *J. Am Chem Soc.*, vol. 123, 2001, pp. 5768-5776.

(Continued)

*Primary Examiner* — Mike Stahl
(74) *Attorney, Agent, or Firm* — Fulbright & Jaworski LLP (57) ABSTRACT

A compressible photonic crystal comprising a polymer with an ordered array of voids, the photonic crystal having a reflectance in a first wavelength range for light incident to its incident surface and its opposing incident surface; wherein compression against at least a portion of at least one of the surfaces shifts the reflectance to a second wavelength range in at least that portion of that surface. The crystal may be used in authentication devices of various types.

59 Claims, 5 Drawing Sheets

(56) References Cited

OTHER PUBLICATIONS

Australian Patent Office, First Examination Report in Australian Patent Application No. 2007346889 mailed Sep. 10, 2012.
Yoshino, K., et al., "Mechanical Tuning of the Optical Properties of Plastic Opal as a Photonic Crystal", Jpn. *J. Appl. Phys.* vol. 38, Jul. 1, 1999, pp. 786-788.

Galloro, Josie, et al., "Replicating the Structure of a Crosslinked Polyferrocenylsilane Inverse Opal in the Form of a Magnetic Ceramic", *Advanced Functional Materials*, vol. 12(5), May 17, 2002, pp. 382-388.
Pursiainen, Otto L, et al., "Compact Strain-Sensitive Flexible Photonic Crystals for Sensors", *Applied Physics Letters*, vol. 87, Aug. 30, 2005, pp. 101902-1 to 101902-3.

\* cited by examiner

COMPRESSIBLE PHOTONIC CRYSTAL

FIELD OF THE INVENTION

The invention relates to a compressible photonic crystal.

BACKGROUND OF THE INVENTION

Photonic crystals (PCs) are materials having a periodic modulation in their refractive index (Yablonovitch, *Phys. Rev. Lett.*, 58:2059, 1987), giving rise to a photonic band gap or stop gap, in which electromagnetic waves within a certain stop band wavelength range are totally reflected. The wavelengths of the stop band are dependent on the distance between the periodic modulations in the crystal. The reflected stop band wavelengths appear in the reflectance spectrum as a distinct reflectance peak known as a Bragg peak. The crystal may have a one-, two-, or three-dimensional periodic structure.

Because of the sensitivity of a PC, slight changes in the refractive index or lattice spacing results in detectable changes in the reflected light. This is particularly useful where the reflected light is in the visible range, allowing for sensors with a colour-based response if an analyte can modulate the refractive index or lattice spacing, or for colour display systems if such modulations can be effected by an electric or electrochemical stimulus. One example of such an application is given by Arsenault et al. in U.S. patent application Ser. No. 10/681,374, which is hereby incorporated herein by reference.

The self-assembly of monodisperse microspheres into close-packed structures allows the formation of colloidal PCs (CPCs) in the form of optical films (Busch et al., *Phys. Rev. E*, 58:3896, 1998; Xia et al., *Adv. Mater.*, 12:693, 2000). They can be made from a plethora of materials, and their stop band wavelength ranges are highly sensitive to changes in the optical characteristics or the structure of the photonic crystal.

Another type of PC is the hydrogel-based PC, such as that described by Asher in U.S. Pat. No. 6,544,800. In the hydrogel CPC, a hydrogel holds charged nanoparticles in an ordered array. The nanoparticles are suspended in a non-close-packed array due to charge repulsion, but are not structurally connected.

PCs can also be made using a templating strategy, in which structures formed by self-assembled monodisperse microspheres are used as a template for an infiltrating material. When the template is removed, the result is a photonic crystal having an ordered array of voids. Such a templating strategy is disclosed in U.S. Pat. No. 6,261,469, the disclosure of which is hereby incorporated herein by reference. The photonic crystal disclosed in this reference is in block form, which may not be suitable in many applications.

Previous studies of deformable PCs have been on the deformation of non-close-packed spheres embedded in hydrogel or elastomer matrices (Holtz et al., *Nature* 389:829-832, 1997; Foulger et al., *Advanced Materials* 13:1898-1901, 2001; Haacke et al., U.S. Pat. Nos. 5,266,238 and 5,368,781, 1993; Asher et al., *Journal of the Material Chemical Society* 116: 4997-4998, 1994; Jethmalani et al., *Chemical Materials* 8:2138-2146, 1996). All of these studies deal with non-porous solid materials, where a compression along one direction must be accompanied by an expansion along perpendicular directions to maintain a constant volume.

An optical device using such a material has been disclosed in U.S. Pat. No. 6,956,689, in which the lateral expansion, bulging, deformation, or distortion of a plastic photonic crystal when vertically compressed is used to vary the wavelength of light transmitted laterally through the crystal.

Haacke et al. in U.S. Pat. No. 5,266,238 disclose the use of a filter film using such a hydrogel PC. In that patent, absorbance of the filter film is shifted by applying tension to the hydrogel PC. The hydrogel PC is compressible, but the fragility of its structure hinders its application. Further, as explained above, such a PC exhibits lateral expansion or bulging upon vertical compression.

Known deformable PCs include PCs having microspheres embedded in a deformable matrix, such as a hydrogel. These exhibit lateral expansion or bulging when vertically compressed, to preserve the constant volume of the PC. Since PC devices are fashioned as a film on a substrate, lateral expansion is accompanied by delamination from the substrate, inhomogeneity in color shift, and/or unrelieved stress in the material leading to loss of longer-term stability.

It is desirable to have a PC that has a stable response to compression. In particular, a reversible response offers a greater variety of applications for the PC. Such a PC may be a thin film PC with high sensitivity to compressive forces. The PC may exhibit point-response—that is, compression in one portion of the PC would not affect any uncompressed portion.

It is also desirable to have a PC that can be used in anti-counterfeiting, anti-tampering, fingerprinting, or strain-sensing applications.

SUMMARY OF THE INVENTION

The present invention provides a compressible photonic crystal (PC) with, in one form, a reversible as well as stable response. The PC may be a thin film photonic crystal, with high sensitivity to compressive forces. The PC may exhibit point-response, such that the response is sensitive to fine details and variations in the compressive force.

In the case where the lattice structure is modulated, a particularly desirable attribute is elasticity of the PC, resulting in reversible tuning. This means the PC may be deformed in response to an external stimulus, then allowed to completely or partially recover, and may be cycled repeatedly.

One aspect of the present invention is a compressible photonic crystal comprising a polymer with an ordered array of voids, the photonic crystal having a reflectance in a first wavelength range for light incident to an incident surface and an opposing incident surface, wherein compression against at least a portion of at least one of the incident surfaces shifts the reflectance to a second wavelength range in at least that portion of the surface.

In another aspect, the polymer is an elastomeric polymer and the photonic crystal has an initial uncompressed structure that deforms when compression is applied and returns to the initial uncompressed structure when compression is released.

Another aspect of the present invention is a method of manufacturing a film of a compressible photonic crystal comprising the steps of: providing an ordered array of microparticles; infiltrating the ordered array of microparticles with a monomer or pre-polymer mixture; initiating cross-linking of the monomer or pre-polymer mixture to form a polymer film; and removing the microparticles from the polymer film to form an ordered array of voids in the polymer film; wherein the film formed of the photonic crystal has a reflectance in a first wavelength range for light incident to an incident surface and an opposing incident surface, and compression against at least a portion of at least one of the incident surfaces shifts the reflectance to a second wavelength range in at least that portion of the surface.

Another aspect of the present invention is an authentication device comprising the photonic crystal described above which may be used in currency, packaging, identification items or documents of value.

Another aspect of the present invention is a method of authentication using the photonic crystal described above comprising the steps of: providing the crystal; compressing against the incident surface of the crystal; and observing the reflectance shift from the first wavelength range to the second wavelength range.

Porous polymer PCs can be compressed with minimal change in structural dimension in directions other than the direction of compression, reducing the redistribution of stress along lateral directions when compressed by a patterned surface. That is, aside from the compressed surface, the uncompressed surfaces of the PC do not expand or bulge out, or otherwise significantly deform or distort. There is no significant change in the lateral dimensions. This results in a PC that exhibits more homogenous behaviour and is more stable in use.

Additionally, the pores in a porous PC can be filled with functional species or the surfaces of the pores provided with functionality, depending on the application.

BRIEF DESCRIPTION OF THE DRAWINGS

In order that the invention may be readily understood, certain embodiments of the invention are illustrated by way of example in the accompanying drawings.

FIG. 3a shows images taken during the compression of an embodiment of the compressible photonic crystal by a finger.

FIG. 3b is a magnification of one of the images of FIG. 3a under different colour filters.

FIG. 3c is a magnification of one of the images of FIG. 3a.

FIG. 3d show energy mappings of the spectral data of the image of FIG. 3c.

FIG. 4a shows the reflectance spectra of an embodiment of the compressible photonic crystal incorporating a quantum dot, over different degrees of compression.

FIG. 4b shows the emission of the quantum dots in the embodiment of FIG. 4a over one compression cycle.

FIG. 4c shows the intensity ratio of the emission of the quantum dots in the embodiment of FIG. 4a over one compression cycle.

FIG. 4d shows the transmission spectra of the embodiment of FIG. 4a overlaid with the emission spectra of the quantum dots.

FIG. 4e shows luminescence decay curves for the quantum dots in the embodiment of FIG. 4a.

DETAILED DESCRIPTION OF THE INVENTION

The compressible photonic crystal, preferably an elastic photonic crystal (EPC), of the present application in one aspect comprises a photonic crystal comprising a polymer, preferably an elastic material such as a polymeric elastomer. The photonic crystal may be in the form of a thin film, which may be on a substrate, depending on the application. The thin film can be less than 100 micrometers in thickness, or between 5 to 10 micrometers in thickness.

Preferably, the elastic material is substantially elastic rather than partially elastic, that is, it deforms under compression and is capable of returning substantially to its uncompressed shape after release of compression, and repeatedly exhibits this behaviour. However, in certain embodiments, the elastic material may be substantially elastic only within a certain range of compressive forces, outside of which range the material may be plastic, that is, it may deform permanently. Even after such a permanent deformation, the material may exhibit elastic behaviour under certain compressive forces.

The polymer contains an ordered array of voids, causing a periodic modulation of the refractive index within the polymer. This periodic modulation gives rise to the characteristic reflectance wavelength of the PC. Preferably, the voids are 100 nm to 1000 nm in diameter, more preferably 200 nm to 900 nm diameter. Preferably, the voids are spherical, and are interconnected. The exact arrangement and dimensions of the voids depend on the template strategy used in the manufacture of the PC.

Light incident to the incident surface, generally the upper surface of the PC is reflected in a characteristic wavelength range, preferably within the visible spectrum. When at least a portion of the incident surface, preferably upper surface of the PC is compressed, preferably in the vertical direction, that is, on its upper or lower surface, the compression causes a change in the periodicity of the voids in the PC, thus resulting in a shift in the reflected wavelength. Generally, as in the embodiment comprising a polymeric elastomer, when the compression is released, the reflected wavelength shifts back to the first wavelength range. By "incident", it is understood that the light does not have to strike the surface of the PC orthogonally, but can be at any angle.

One embodiment of the photonic crystal of the present invention is substantially reversible, comprising a substantially elastic material, such as a polymeric elastomer. By "substantially reversible" is meant that the structure of the PC returns to its initial state within an observable tolerance. This may be a visual tolerance—that is, the colour after release of compression is noticeably the same as the initial, uncompressed colour—or some other tolerance, such as that detectable by an infrared or ultraviolet detector. Similarly, a "substantially elastic" material is a material, preferably a polymeric elastomer that provides a PC with this behaviour.

It is possible to use polymers that are not elastomeric and hence cross-linked. The type and variety varies considerably, but suitable examples include polystyrenes, polymethacrylates, polyacrylates, polyurethanes, polyesters, polyethylenes, polypropylenes, polyvinylchlorides and waxes. Specific polymers include the monomers and pre-polymers listed hereinafter in respect of the elastomers.

Elastomers can generally be characterized by crosslinked chains. To make the chain, many monomers may be polymerized together. They are amorphous polymers existing above their glass transition temperature, so that considerable segmental motion is possible. At ambient temperatures elastomers are thus usually relatively soft (E approximately equal to 3 MPa) and deformable. Their primary uses are for seals, adhesives and molded flexible parts.

Elastomers are usually thermosets (requiring vulcanization) but may also be thermoplastic. The long polymer chains cross-link during curing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-700%, depending on the specific material. Without the cross-linkages or with short, uneasily reconfigured chains, the applied stress would result in a permanent deformation.

Temperature effects are also present in the demonstrated elasticity of a polymer. Elastomers that have cooled to a glassy or crystalline phase will have less mobile chains, and consequentially less elasticity, than those manipulated at temperatures higher than the glass transition temperature of the polymer.

Because the amount of change in the periodicity of the voids is dependent on the amount of compression applied (the greater the compression, typically the greater the change), the amount of shift in reflectance wavelength is also dependent on the amount of compression. This results in an analog PC, and allows for detection not only of a compressive force, but also a distinction between different compressive forces. Preferably, the amount of shift in reflectance wavelength is linearly dependent on the amount of compressive force.

As discussed above, the elastic material may be substantially elastic or partially elastic. The PC may be made of substantially elastic material, such as a polymeric elastomer, so that the PC can undergo repeated compression-decompression cycles. However, it is also possible that the PC does not fully return to its original uncompressed reflectance wavelength, such that it has a limited number of uses or limited lifetime. Another possibility is that the PC is not substantially elastic for a certain large compressive force, but is substantially elastic for a smaller compressive force, such that any force beyond a certain threshold will cause a permanent change in the reflectance of the PC, but the PC can still be repeatedly used afterwards with smaller compressive forces.

In one embodiment of the invention, the shift in the reflected wavelength is visually detectable. This may be a shift in wavelength as small as 5 nm.

It is also possible for the PC to have reflectance wavelengths that are outside the visible spectrum. For example, compression may shift the reflected wavelength from the infrared range into the visible spectrum, or from the visible spectrum into the ultraviolet ranges. It may be that both the uncompressed and the compressed reflectance wavelengths are outside the visible spectrum, in which case the shift in reflectance is detectable by standard infrared or ultraviolet detection methods known to those skilled in the art.

For certain applications, the PC may be on a substrate. It may desirable for the PC to be resting or mounted on a substrate, for ease of handling or for increased robustness. Any substrate may be used, provided it does not damage the PC. Possible substrates include paper, glass, plastic, metals, and ceramics. One preferable substrate is glass. In this case, a change in reflectance can also be observed for light incident to the lower surface of the PC. Another preferable substrate is a flexible substrate, such as plastic. This allows the PC to be compressed from the lower, or opposing incident surface, and the change in reflectance to be observed on the upper surface. The EPC may be formed on the substrate or mounted thereon, as noted above. Suitable means for securing the PC to the substrate may be used, if necessary. Such means would be apparent to a person skilled in the art.

When the polymer comprising the PC is a polymeric elastomer or elastic polymer, it may be selected from a cross-linked polymer network. The polymer may be formed from a monomer and/or pre-polymer selected from the group consisting of methacrylic acid esters, acrylic acid esters, polyisoprene, polybutadiene, polyurethane precursors, crosslinkable polyethers, and mixtures thereof. In the case of a methacrylic acid ester, it may be selected from the group consisting of ethylhexyl methacrylate, lauryl methacrylate, butyl methacrylate, methyl methacrylate, stearyl methacrylate, butoxyethyl methacrylate, and mixtures thereof. In the case of an acrylic acid ester, it may be selected from the group consisting of butoxyethyl acrylate, hydroxyethyl acrylate, 2-carboxyethyl acrylate, stearyl acrylate, lauryl acrylate, butyl acrylate, hexyl acrylate, and mixtures thereof. In the case of a crosslinkable polyether, it may be selected from the group consisting of polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

Other polymers may be used. The material will have a network structure, and a glass transition temperature lower than its operational temperature. Other possible materials are disclosed in U.S. Pat. No. 6,946,086, the disclosure of which is incorporated herein by reference.

Example 1

One example of the present invention is a substantially reversible elastic PC (EPC), in which the photonic crystal comprises alkylmethacrylate as the polymer, with an ordered array of voids.

In this example, the EPC has an area of 1 cm$^2$ and a thickness of about 5 micrometers. The EPC rests on a glass substrate, although any material can be used for the substrate. A thicker, more rigid EPC can be used without a substrate. However, a soft EPC is preferred for better responsiveness.

Figure 2A:
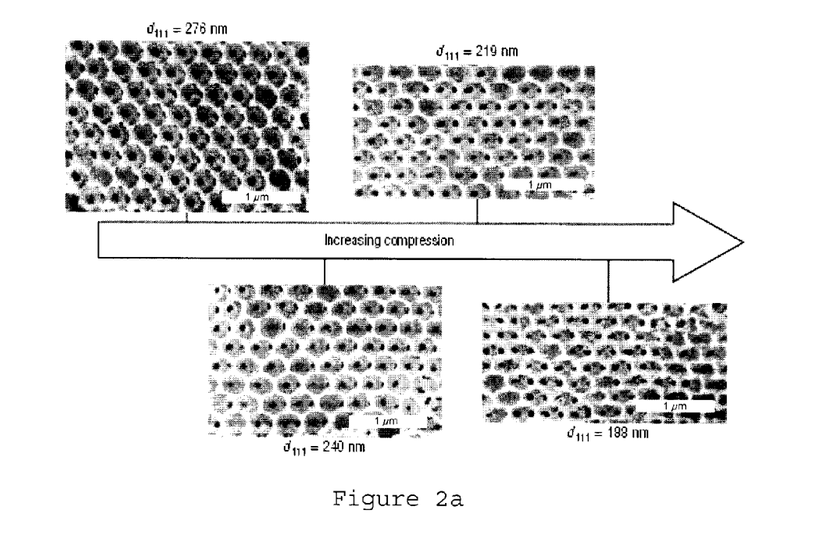
FIG. 2a shows scanning electron microscope (SEM) images of one embodiment of the compressible photonic crystal undergoing compression.

FIG. 2a shows the distortion of the voids upon vertical compression. The images shown in FIG. 2a were taken using scanning electron microscope (SEM). SEM measurements were performed on a Hitachi S-5200 SEM, using an accelerating voltage of 1.5 kV and arc-coating the samples with a thin carbon film before imaging. The monomer composition of the imaged samples was a methyl methacrylate-butyl methacrylate mixture, which is glassy at room temperature. The EPC was heated to between 60° C. and 120° C., compressed, then cooled to freeze-in the compression. Samples were then cleaved and imaged as cross-sections.

In the example shown, the relaxed EPC has roughly circular voids with diameters of about 345 nm. The vertical spacing between the voids (d[111]) is about 276 nm when the EPC is relaxed. When compressed, d[111] decreases to about 188 nm. However, the lateral spacing between the voids (i.e. in the {111} plane) remain constant within experimental error. As shown, compression of the EPC proceeds by a reduction of the air volume fraction and the distortion of the cross-sectional void spaces from roughly circular to elliptical shape. By compressing with a patterned elastomeric stamp, it was found that feature sizes down to 5 µm could be visualized using this example.

Example 2

Figure 2B:
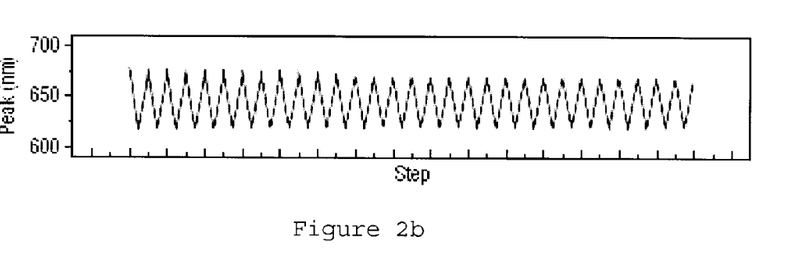
FIG. 2b shows the reflectance wavelength of an embodiment of the compressible photonic crystal undergoing compression-decompression cycling.

FIG. 2b shows the compression-decompression cycling of the reflectance peak position for an EPC with about 350 nm diameter voids, subjected to a spring-coupled actuator compression of 12 mm resulting in approximately 15 kPa compressive stress. Spectra were collected at 1.2 mm compression intervals.

Example 3

Figure 2C:
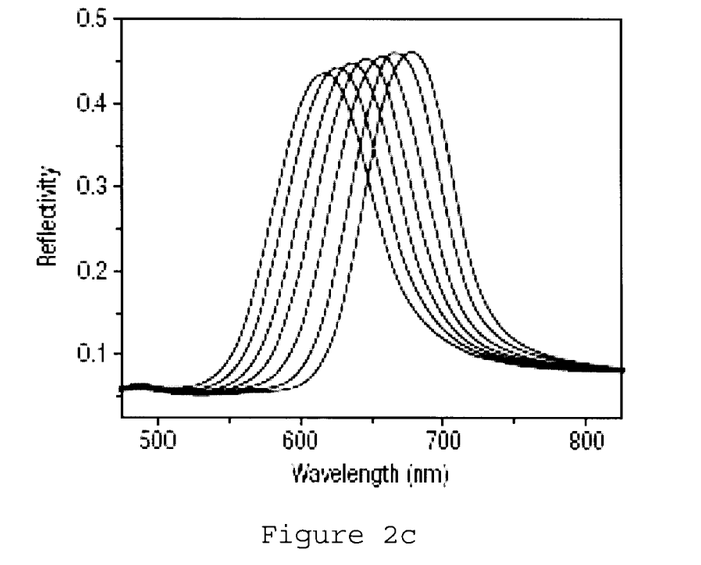
FIGS. 2c and 2d show the shift in reflectance wavelength of two embodiments of the compressible photonic crystal with different void sizes undergoing compression.
Figure 2D:
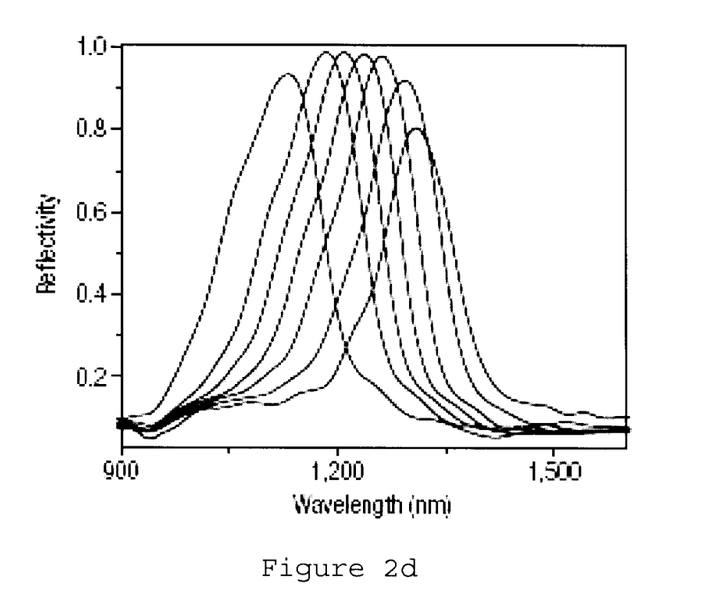

FIGS. 2c and 2d show the reflectivity spectra of normal incident light during compression of EPCs with 350 nm and 710 nm diameter voids, respectively. The spectra can be seen to blueshift (i.e. shift to shorter wavelengths) during compression. Note that the amount of blueshift is dependent on the amount of compression applied.

Manufacture of Photonic Crystal

Figure 1:
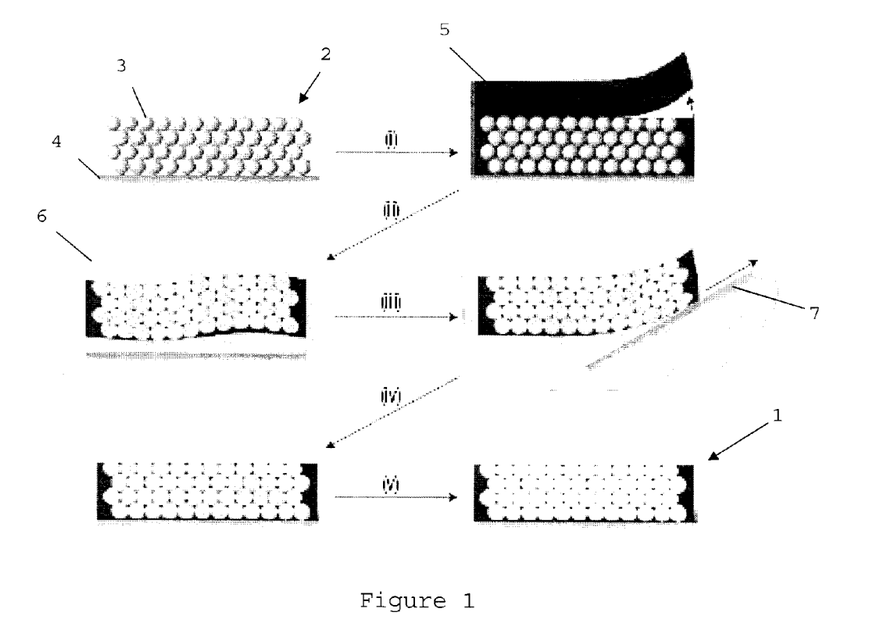
FIG. 1 illustrates the manufacture of a compressible photonic crystal in accordance with one embodiment of the present invention.

One aspect of the present invention is a method of manufacturing a compressible photonic crystal, preferably as a film, as illustrated in FIG. 1 and described below.

One preferred embodiment of the manufacturing method is a templating strategy to fabricate the PC 1, which provides control over both the material composition and structural order. The method is illustrated in FIG. 1 and has the following steps (all compounds mentioned below are standard compounds available from sources such as Sigma-Aldrich):

(i) Formation of the microsphere template film 2, preferably using a colloidal PC film of high-quality silica ($SiO_2$) microspheres 3 on a glass substrate 4. The microspheres 3 may also be formed from a polymer, such as polystyrene and polymethacrylate. The template film 2 may be formed using self-assembly methods such as evaporation-induced self-assembly (EISA), isoconvective heating, sedimentation, shear assembly, parallel plate confinement, spin-coating, dip-coating, and drop-casting.

Methods of sphere deposition are disclosed in U.S. Pat. No. 6,858,079, incorporated herein by reference. Such disclosed methods include the steps of: synthesizing monodisperse silica spheres, wherein each of the silica spheres preferably has a diameter greater than or equal to about 400 nanometers; purifying the silica spheres; and self-assembling the silica spheres into a plurality of ordered, planar layers on a substrate. Infiltrated planar opals may also be manufactured by further processing the large sphere planar opal by sintering the planar opal and infiltrating the planar opal with a predetermined material. Inverted planar opals may further be manufactured by removing the silica spheres from the infiltrated planar opal. Other modifications to the substrate and planar opal may be provided to enhance the properties of these photonic crystals.

The silica microspheres 3 may be synthesized according to a modified Stöber process. The template films 2 are generated using EISA either at room temperature for spheres below 400 nm in diameter or under isoconvective heating conditions for spheres above 400 nm in diameter, on glass substrate 4, such as a microscope slide. Preferably, the microspheres 3 have diameters of 200-900 nm. After deposition, the films 2 are mechanically stabilized by overnight treatment in tetramethoxysilane vapour, resulting in necking. Other suitable necking methods may be used, including necking using silicon tetracholoride vapour.

Interconnection of the microspheres in the template by necking will result in interconnected voids in the final PC 1. Interconnections aid in later etching away the microspheres, which may otherwise remain in the PC 1 and affect the mechanical and optical properties of the PC 1.

Methods of necking the microspheres by vapour treatment are disclosed in U.S. Patent Application Publication No. 2004/0062700, incorporated herein by reference. Disclosed methods include forming necking using a homogeneous layer of uniform and controllable thickness of a metal oxide. This metal oxide layer is grown in a layer-by-layer process and is chemically bonded to the microsphere surface and serves to enhance the mechanical stability of the template, in addition to acting to control the pore size or void volume between the microspheres in the lattice. Necking serves to control the degree of connectivity of the microspheres making up the template and, consequently, the pore size, filling fraction, mechanical stability and optical properties of the template, without disrupting its long range order and without the deleterious effects of lattice contraction induced cracking observed in conventional necking methods based on thermal sintering. Such control of the template structure corresponds to control of the resultant PC 1 made from that template.

Necking is also possible by thermal annealing, as disclosed in U.S. Pat. Nos. 6,261,469 and 6,517,763, previously incorporated herein by reference.

(ii) The template film 2 is infiltrated with a mixture of monomer and/or pre-polymer, which may include a cross-linking agent and an initiator, such as a photoinitiator, and is photopolymerized to generate a polymeric network 5. This network 5 will form the resultant PC 1. A thermal initiator may also be used, in which case polymerization takes place by applying heat.

The infiltrating mixture may be a non-volatile, non-viscous liquid at room temperature. Although an initiator and cross-linking agent may be used to polymerize the mixture, this is not necessary. For example, the monomer and/or pre-polymer may form links by itself, which can be initiated, for example, by being subjected to an electron beam.

The monomer and/or pre-polymer may comprise methacrylic acid esters, acrylic acid esters, polyisoprene, polybutadiene, polyurethane precursors, crosslinkable polyethers, and mixtures thereof. In the case of a methacrylic acid ester, it may be selected from the group consisting of ethylhexyl methacrylate, lauryl methacrylate, butyl methacrylate, methyl methacrylate, stearyl methacrylate, butoxyethyl methacrylate, and mixtures thereof. In the case of an acrylic acid ester, it may be selected from the group consisting of butoxyethyl acrylate, hydroxyethyl acrylate, 2-carboxyethyl acrylate, stearyl acrylate, lauryl acrylate, butyl acrylate, hexyl acrylate, and mixtures thereof. In the case of a crosslinkable polyether, it may be selected from the group consisting of polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

The cross-linking agent may be selected from the group consisting of dimethacrylates, trimethacrylates, tetramethacrylates, diacrylates, triacrylates, and tetraacrylates. The photoinitiator may be phenylbis(2,4,6-trimethylbenzoyl) phosphine oxide. If a thermal initiator is used, it may be dicumylperoxide.

The template may be infiltrated with a mixture of alkylmethacrylate and ethylene glycol dimethacrylate crosslinker, and photopolymerized using an ultraviolet photoinitiator.

It will be apparent that other materials can be used to infiltrate the template. The final polymerized material may be substantially elastic, should have a network structure, and should have a glass transition temperature lower than its operational temperature. The material may be a polymeric elastomer. By polymeric elastomer is meant a polymer having good robustness and an appreciable degree of reversibility and elasticity. Such a material preferably has good sensitivity and good shape-memory. Such properties are discussed in *Polymer Physics* by M. Rubinstein et al., from Oxford University Press, USA (published Jun. 26, 2003).

Such a material should be sensitive enough to be compressed by appropriate compression forces, such that if a pressure is applied over a larger area of the PC 1 the sensitivity must be higher, whereas if the same pressure is applied onto a small area the sensitivity can be lower. A material with good sensitivity is preferably responsive to manual pressure. For applications requiring only a finger for pressure, materials must be quite responsive. To use less sensitive materials, a pattern or fine features of some sort can be pressed into the material (using a finger) to increase the pressure per area. For very high pressures per area (i.e. pressing a sharp nib/tip into the material), the sensitivity can be relatively low. The compressive force may be applied by finger pressure or a stylus, for example.

By shape-memory is meant that is there is a driving force for the material regaining its original shape after compression. This driving force may be strong such that the original shape is quickly regained, or moderate such that the material regains its original shape slowly, or weak such that the driving force is so low that the material regains its shape very slowly or not at all. Often, for a material with good shape-memory, this driving force is at least moderate.

When selecting the material and/or the monomer mixture and/or the pre-polymer mixture to form the polymeric network 5, it is important to consider the ability of the material to infiltrate into the template film 2. While some air bubbles (other than the intended voids) within the PC 1 are acceptable, the presence of air bubbles may nonetheless affect the performance of the resultant PC 1.

The mixture may be a liquid, having a low vapor pressure at ambient conditions (that is, the evaporation of the mixture components is not such that it changes the ratios of the components within the mixture), stable in an uncrosslinked state (that is, it will not spontaneously crosslink before infiltration), and is crosslinkable (that is, the mixture does not contain any inhibitors that may prevent crosslinks from forming or the initiator from functioning).

The degree of infiltration is dependent on the molecular weight and degree of existing cross-links in the monomer and/or pre-polymer mixture. Infiltration can be aided by heat, agitation, vacuum or pressure. For practical purposes, the template 2 does not need to be completely infiltrated, and the presence of air bubbles in the final PC 1 is acceptable. After polymerization, the excess polymer is peeled or abraded from the upper surface.

The compressive behaviour of the PC 1 is affected by not only the choice of material forming the polymeric network 5, but also the degree of cross-linking within the polymeric network 5. Hence, the selection and concentration of cross-linker and initiator is important, as is the actual polymerization process.

(iii) The microspheres 3 and substrate 4 are etched in dilute hydrofluoric acid, freeing the polymeric network 5.

In general, where the microspheres are silica spheres, they may be etched by hydrofluoric acid, as taught by Blanco et al. in *Nature* 405 (6785):437-440 (May 25, 2000). They may also be etched by sodium hydroxide, as taught by her in *The Chemistry of Silica: Solubility, Polymerization, Colloid and Surface Properties and Biochemistry of Silica*, published by Wiley-Intersiences (May 1979).

The microspheres may also be polymer spheres, in which case they may be dissolved by various polymer solvents, as taught by Candau et al. in *An Introduction to Polymer Colloids,* 1st edition, published by Springer (Dec. 31, 1989).

(iv) Once transferred onto a water surface, preferably distilled water, the polymeric network 5 can be deposited onto any second substrate 7 drawn through the air-water interface.

(v) The polymeric network 5 is dried, preferably using a stream of nitrogen, to remove the water filling the periodic voids, resulting in the final PC 1.

Example 4

In an example of a manufacturing method, ethylene glycol dimethacrylate cross-linker (0.800 g, 4.04 mmol) was added to neat ethylhexyl methacrylate (8.00 g, 40.3 mmol) at 20° C. in the absence of light. Volatiles were removed in vacuo for 5 min and phenylbis(2,4,6-trimethylbenzoyl)phosphine oxide initiator (0.080 g, 0.191 mmol) was added at 20° C. and stirred under nitrogen for 10 min. The resultant yellow solution was transferred to a vial containing the colloidal crystal template, to completely cover the template. The vial was cooled to 5° C. and photo-irradiated for 5 h using a 125 W high-pressure Hg arc lamp with a pyrex-glass filter (wavelength $\lambda$ approximately grater than 300 nm) to give a template-embedded piece of colourless solid elastomer. Synthesis of other polymer compositions was performed according to this procedure, replacing ethylhexyl methacrylate with lauryl methacrylate, butyl methacrylate, methyl methacrylate, butyl acrylate, hexyl acrylate or mixtures thereof.

The glass vial was cracked open and excess elastomer was slowly peeled off the surface of the template. The polymer-silica composite film was then sectioned into pieces of the desired size and these were immersed in 2% aqueous hydrogen fluoride. After 5-20 min, the polymer film floated off the underlying substrate and was transferred onto distilled water where it floated at the air-water interface. After standing for 10 min, the floating polymer was deposited onto a given flat, curved, or other patterned substrate by withdrawing this substrate through the air-water interface. Excess water was soaked with tissue paper, and the water in the voids of the structure was evaporated under a stream of nitrogen gas to give the final PC.

Using this method, a robust PC can be manufactured having a large area (several $cm^2$) and of variable stiffness, on flat, curved, or other patterned glass, metal and polymer substrates. Any material may be used as the substrate, depending on the specific application. Possible materials include glass, paper, metal, and plastics.

Method of Use

The PC can be incorporated into an authentication device, preferably for use in currency, packaging, or identification items.

The PC can be used in a method of authentication, in which a user compresses the PC and observes a shift in the reflected wavelength.

Preferably, the reflected wavelength shifts to a predetermined and/or known second wavelength, so that the user can verify the authenticity. Because the PC has an analog response, the PC exhibits this predetermined and/or known second wavelength upon application of a predetermined and/or known compressive force.

The PC reflects light in its stop-band wavelength. When compressed, the stop-band wavelength shifts to shorter wavelengths, resulting in a visibly detectable change in the reflected light.

While any surface of the PC can reflect light, generally, light is reflected from its upper surface. Thus, vertical compression of the PC from the top or the bottom can result in a change in the reflected light. Light can be incident to the surface at an angle as well. This will alter the spectral position, intensity, and spectral width of the reflected light.

The PC typically has an analog response. That is, the greater the compression applied, the greater the shift in wavelength. The relationship between the applied compression and the wavelength shift depends on the polymer the PC. Preferably, this relationship is linear.

While ideally the PC is reversible, and usually substantially reversible, a partially reversible PC is possible, depending on the polymer used and the degree of cross-linking (i.e. concentration of cross-linker used). Compression of the crystal beyond a certain compression threshold can also affect the ability of the crystal to fully revert.

The PC of the present application can be applicable to several emerging applications such as anti-counterfeiting patches, anti-tamper packaging, new fingerprinting materials, piezo-electric driven colour displays, accelerometer sensors for air-bag release in automobiles, sensors to monitor explosion shockwaves, colour sensing of strain in high-rise buildings, as well as tunable band-edge LEDs and laser sources.

Other applications include use for anti-counterfeiting in: a) documents of value, including legal tender, bills of exchange, money orders, share certificates, bonds, stamps, land titles; b) cards and Identification, including passports, birth certificates, driver licenses, visa documents, health cards, social security cards, national identity cards, work permits, citizenship documents, alien registration documents, credit cards, debit cards, gift cards, access passes, and membership cards; and c) product packaging and tagging, including that for over-the-counter and prescription drugs, medicines and pharmaceuticals, vaccines, vitamins, nutritional supplements, herbal formulations, herbicides, pesticides, apparel, accessories, watches, clothes, shoes, handbags, cosmetics, toys, jewelry, gems, precious metals, compact Discs, videotapes, DVDs, computer software, video games, other media, technology products, batteries, airline parts, auto parts, small arms, wine, spirits, beer, cigarettes, cigars, books, sports equipment and memorabilia, collectibles, and antiques.

Example 5

One particular use of the PC is for fingerprinting. A practical high-sensitivity fingerprint identification PC would comprise the PC integrated with a pressure sensor and a camera capturing images at a particular imprint pressure. Since the PC gives an analog response, a certain pressure will result in an imprint image with a certain reflected set of wavelengths.

One embodiment of the present invention can be used in the study of elasticity at the nanometer scale where surface effects become increasingly important, and could enable the application of commercial elastomers in nanotechnology. Preliminary investigations have found strong nonlinear dependence of elasticity in an elastic PC on the size of the microspheres in the inverse opal template (and hence the resultant voids). The regular porosity of PCs make them suitable candidates for optically monitored mechanical deformations using a cellular solid structural model, with the periodicity and volume fraction being strictly controlled by straightforward modifications of the microsphere template.

Figure 3:
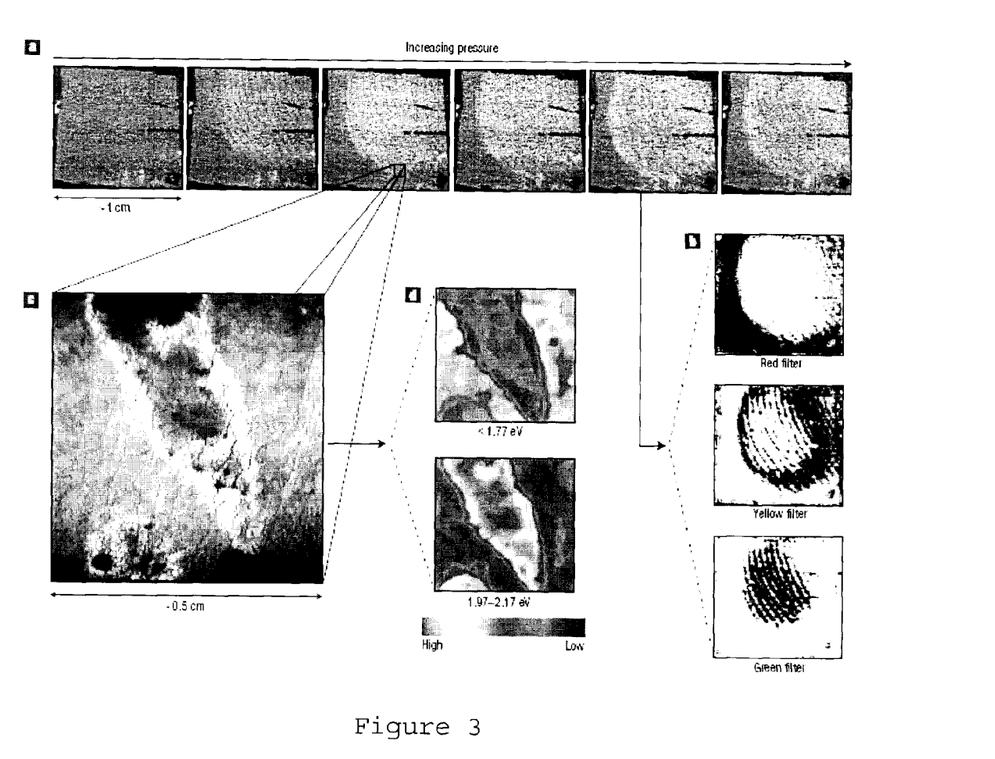

One application is in biometric recognition PCs, fingerprinting in particular. FIG. 3a shows still images taken during the compression of one embodiment of an PC in accordance with the present invention by an index finger. FIG. 3b shows greyscale images of one of the frames in 3a, obtained after the application of colour filters. The black regions in each filtered image correspond to the distribution of a particular pressure range, increasing from red to green. In FIG. 3c is shown a microscope image of a single line termination in the fingerprint-compressed PC. A complete reflection spectrum has been collected for each pixel in this image. FIG. 3d show energy mappings of the spectral data of the image in FIG. 3c collected by microspectroscopy. The top frame shows the integrated intensity in the energy range of less than 1.77 eV, whereas the bottom frame shows the integrated intensity in the range 1.97-2.17 eV.

This embodiment can be used as a time and pressure dependent colour fingerprinting device having good accuracy and sensitivity. As seen from FIG. 3b, by applying colour filters, it is possible to show not only the characteristic line ridges, but also the pressure distributions over the finger surface, since the resulting colour is dependent on the amount of compression applied to the PC. This attribute allows differentiation between an imprint from a real finger and a rubber replica (PDMS), where the latter gives much sharper pressure contrast between ridges and valleys.

One practical high-sensitivity identification device may consist of a PC of the present invention integrated with a pressure sensor and a camera capturing images at a particular imprint pressure. Further information can be extracted from a microscopic analysis of the fingerprint pattern. In FIGS. 3c and 3d, a complete visible reflectance scan was collected for each pixel of the images in FIG. 3a and the integrated intensity for different spectral ranges were plotted. Such selected energy fingerprint maps can facilitate data analysis by considering points above a certain intensity threshold or identify specific marks such as high- or low-intensity features.

Example 6

The porous nature of the PC can also be exploited to embed functional species within the PC. The interaction between the behaviour of the embedded species and the response of the PC can give rise to devices with higher sensitivity or different applications.

In one embodiment of the present invention, NIR- (near infrared) emitting colloidal PbS (lead sulfide) quantum dots can be incorporated onto the surface of the PC defining the void spaces in the PC. The dynamic tuning of spontaneous emission behaviour of lead chalcogenide NIR-emitting quantum dots may be applied in the development of tunable NIR light sources and high-efficiency solar cells. When the stop-gap of the PC overlaps with the PbS PL (photoluminescence) peak, the shape of the spontaneous emission curve is strongly modified, an effect that can be dynamically adjusted by compression.

Figure 4:
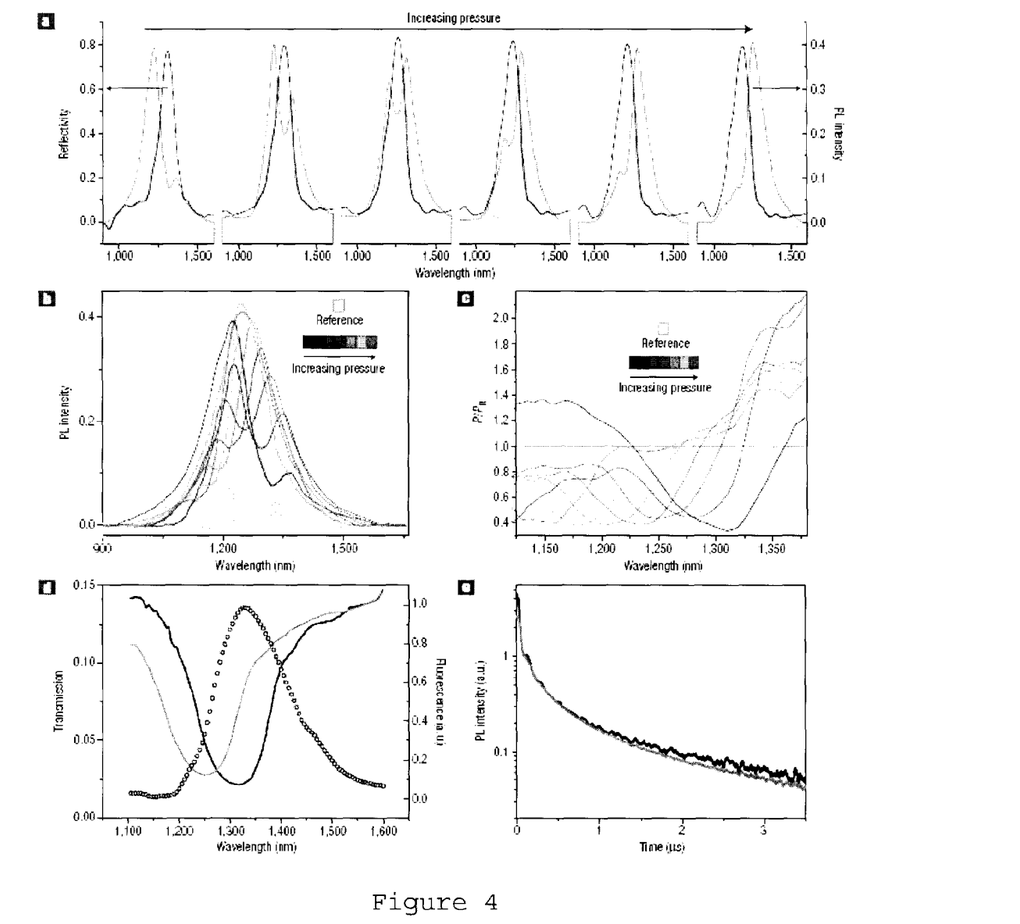

One example of this effect is shown in FIG. 4a, which shows an overlay of the PC stop-band (solid black line) and the PbS PL peak (grey filled curve), for increasing degrees of compression. In the example used to provide the results shown in FIG. 4a, colloidal PbS quantum dots were prepared according to a high-temperature organometallic route, for example that disclosed in Cademartiri et al., *Small* 1:1184-1187. A drop of a concentrated solution in hexane was dropped onto an PC and rapidly dried with a stream of nitrogen. The quantum dots were excited with 0.75 mW continuous wave output of a frequency-doubled Nd:YAG laser at 532 nm. PL was measured with the same setup as the reflectance spectra.

A similar effect has been observed in samples where rhodamine dye-modified microspheres were self-assembled in deionized media and subsequently fixed in an elastomeric matrix by photopolymerization. To obtain a reference spectrum, the PC was compressed until the photonic stop-gap is blue-shifted out of the range of the PL peak. This peak represents the same population of dots without the influence of the photonic band structure.

FIG. 4b shows the overlap of all the collected PL spectra (normal incidence) of the same spot on the sample (about 0.5 mm$^2$) at different applied pressures over one compression cycle, with observable suppression and enhancement relative to the reference. The grey curve represents the PbS PL with no influence from the PC stop-gap.

To quantify this effect, the PL plots were divided by the reference PL emission (FIG. 4c) to give intensity ratios. FIG. 4c shows the intensity ratio of the PL curves in FIG. 4b relative to the reference. P/PR represents the photoluminescence intensity of the sample divided by that of the reference. Here, values above 1 represent enhancement, whereas those below 1 represent suppression. The luminescence spectra are not corrected in any way and all spectra are collected from the same spatial region of the sample, making the intensities of all curves directly comparable. The suppression follows the shift of the stop-gap and stays constant at about 60%. The enhancement is greatest at the red edge of the PL peak and reaches a maximum of about 100%.

FIG. 4d is a graph showing the transmission spectra of the PC example in its native (black solid curve) and compressed (grey solid curve) states. Overlaid onto this is the PL spectrum of PbS quantum dots dried on a glass slide, obtained on excitation of the dots with a high (82 MHz) repetition rate (Ti:sapphire) mode-locked laser operated at 810 nm.

One feature of PCs is the redistribution of photonic density of states (PDOS), which can lead to enhanced decay rates for increased PDOS and suppressed rates for decreased PDOS, as well as a pronounced direction dependence of light emission and propagation. This behaviour is illustrated in FIG. 4e, which shows luminescence decay curves for the infiltrated quantum dots in this example, in both the native (black solid curve) and compressed (grey solid curve) states.

In the example used to provide the results shown in FIG. 4e, quantum dots infiltrated into the PC samples were excited with <4 mJ, 10 ns pulses using a Nd:Yag Q-switch laser operated at 1,064 nm. Every curve is averaged over 512 pulses to reduce experimental noise. The fluorescence was collected by an InGaAs photodiode, which was sufficiently fast (20 ns rise time) to resolve the time decay. The excitation was performed at oblique incidence, 60° from the [111] direction, whereas the fluorescence was collected with a 50 mm lens with a 30° focal cone. The residual excitation light was blocked with frequency selective filters, with a suppression ratio of $10^{-6}$. The fluorescence decay was monitored as a function of the pressure applied to the PCs in the [111] direction, normal to the supporting substrate surface.

FIG. 4e shows PL lifetime data for a sample with and without compression along the [111] direction, with the corresponding normal-incidence stop-bands shown in FIG. 4d, overlaid onto the PL spectrum of the same quantum dots dried on a glass slide. The luminescence decay curves are typical of dried quantum dots, as they show the effects of energy-transfer processes between dots of different sizes. The initial fast decay is non-exponential and comparable in both curves, dominated by energy-transfer processes that should not be significantly altered by a modification of the PDOS. The slower component (after 1.5 µs), which is nearly exponential, is the most affected as it is almost entirely governed by radiative recombination. When the pseudogap lays on top of the luminescence curve (black curve, FIG. 4e), the luminescence decay after 1.5 µs is 1.47±0.05 µs, significantly slower than in the case of the pseudogap being blue-shifted with respect to the luminescence (grey curve), where the decay is 1.27±0.03 µs. The magnitude of the changes in lifetime, 16±4%, may be significant when one considers the combined effects of the low refractive index contrast in the material and relatively thin samples. In other studies, direction-dependent enhancement and suppression of luminescence was observed with changes in luminescence lifetimes of about 5%. A strong modulation in luminescence lifetimes requires a strongly scattering system and a crystal with a much greater number of unit cells in the (111) direction. The magnitude of the luminescence lifetime change is in qualitative agreement with theoretical simulations of the local PDOS in these PC samples (finite-difference time domain calculations, results not shown), although these values are very sensitive to the precise locations of the quantum dots in the PC scaffold considering the anisotropic nature of the deformation. This reversible tuning of the luminescence profile and lifetime from quantum dots lends itself to various possible applications of NIR-emitting quantum dots.

One example is the incorporation of near infrared (NIR) emitting quantum dots into the pores of the PC in the PC. In the case where the reflectance wavelength of the PC overlaps with the emission wavelength of the quantum dot, the shape of the emission curve is strongly modified. This effect can be dynamically adjusted by compression.

A general method of authentication using an embodiment of the present invention comprises the steps of pressing one surface of the PC, then releasing the pressure and observing a colour change in the reflected light. Such an authentication method may be computer-controlled, in which case a predetermined pressure is applied and a predetermined colour change should be detected, if authentic. Instead of a colour change, the reflected light may be in the infrared or ultraviolet ranges.

A simple device for such an authentication application comprises the PC of the present invention, with a transparent, flexible cover over the surface to be pressed. Such a cover will prevent contaminants from entering the voids in the PC.

Although the above description relates to specific examples as presently contemplated by the inventors, it will be understood that the invention in its broad aspect includes functional equivalents of the elements described herein.

What is claimed is:

1. A compressible photonic crystal comprising an elastomeric polymer with an ordered array of voids, the photonic crystal having a reflectance in a first wavelength range for light incident to an incident surface and an opposing incident surface, wherein compression against at least a portion of at least one of the incident surfaces shifts the reflectance to a second wavelength range in at least that portion of the surface, wherein the photonic crystal has an initial uncompressed structure that deforms when compression is applied and returns to the initial uncompressed structure when compression is released.

2. The photonic crystal of claim 1 wherein the second wavelength range has a spectral position that is dependent on a magnitude of the compression.

3. The photonic crystal of claim 2 wherein the spectral position of the second wavelength range is linearly dependent on the magnitude of the compression.

4. The photonic crystal of claim 1 wherein uncompressed surfaces of the photonic crystal are free of bulges when the incident surface is compressed.

5. The photonic crystal of claim 1 wherein reflectance of light incident to an uncompressed portion of the photonic crystal that is free of the compression is unaffected by the compression.

6. The photonic crystal of claim 1 wherein the photonic crystal is a thin film.

7. The photonic crystal of claim 6 wherein the thin film has a thickness of less than or equal to about 100 micrometers.

8. The photonic crystal of claim 1 wherein the photonic crystal is on a substrate.

9. The photonic crystal of claim 8 wherein the substrate is a flexible substrate.

10. The photonic crystal of claim 8 wherein the substrate is selected from the group consisting of: papers, glass, plastics, metals, and ceramics.

11. The photonic crystal of claim 1 wherein the voids have an average diameter in the range of about 100 nm to about 1000 nm.

12. The photonic crystal of claim 11 wherein the voids have an average diameter in the range of about 200 nm to about 900 nm.

13. The photonic crystal of claim 1 wherein the voids are spherical.

14. The photonic crystal of claim 1 wherein the voids are interconnected.

15. The photonic crystal of claim 1 wherein at least one of the first and second wavelength ranges are in the visible range.

16. The photonic crystal of claim 1 wherein at least one of the first and second wavelength ranges are in the ultraviolet range.

17. The photonic crystal of claim 1 wherein at least one of the first and second wavelength ranges are in the infrared range.

18. The photonic crystal of claim 1 wherein the first and second wavelength ranges differ by at least 5 nm.

19. The photonic crystal of claim 1 wherein the polymeric elastomer is compressible by manual pressure and is substantially elastic.

20. The photonic crystal of claim 1 wherein the polymeric elastomer is a cross-linked polymer network.

21. The photonic crystal of claim 20 wherein the cross-linked polymer network comprises at least one of cross-linked polymethacrylate and cross-linked polyacrylate polymers.

22. The photonic crystal of claim 20 wherein the cross-linked polymer network is formed from a monomer or pre-polymer selected from the group consisting of methacrylic acid esters, acrylic acid esters, polyisoprene, polybutadiene, polyurethane precursors, crosslinkable polyethers, and mixtures thereof.

23. The photonic crystal of claim 22 wherein the methacrylic acid ester is selected from the group consisting of ethylhexyl methacrylate, lauryl methacrylate, butyl methacrylate, methyl methacrylate, stearyl methacrylate, butoxyethyl methacrylate, and mixtures thereof.

24. The photonic crystal of claim 22 wherein the acrylic acid ester is selected from the group consisting of butoxyethyl acrylate, hydroxyethyl acrylate, 2-carboxyethyl acrylate, stearyl acrylate, lauryl acrylate, butyl acrylate, hexyl acrylate, and mixtures thereof.

25. The photonic crystal of claim 22 wherein the crosslinkable polyether is selected from the group consisting of polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

26. The photonic crystal of claim 1 wherein the photonic crystal further has a second reflectance in the first wavelength range for light incident to its opposing incident surface, and compression of at least a portion of the incident surface shifts the second reflectance to the second wavelength range.

27. A method of manufacturing a compressible photonic crystal film comprising the steps of:
   providing an ordered array of microparticles;
   infiltrating the ordered array of microparticles with a monomer or pre-polymer mixture;
   initiating cross-linking of the monomer or pre-polymer mixture to form a polymer film; and
   removing the microparticles from the polymer film to form an ordered array of voids in the polymer film thereby providing the photonic crystal film;
   the photonic crystal film having a reflectance in a first wavelength range for light incident to an incident surface of the film and an opposing incident surface of the film, and compression against at least a portion of at least one of the incident surfaces of the film shifts the reflectance to a second wavelength range in at least that portion of the surface;
   wherein the photonic crystal firm has an initial uncompressed structure that deforms when compression is applied and returns to the initial uncompressed structure when compression is released.

28. The method of claim 27 further comprising removing an excess portion of polymer surrounding the microparticles before removing the microparticles.

29. The method of claim 27 further comprising placing the polymer film on a substrate after removing the microparticles.

30. The method of claim 29 wherein the substrate is a flexible substrate.

31. The method of claim 29 wherein the substrate is selected from the group consisting of: paper, glass, plastic, metals, and ceramics.

32. The method of claim 29 wherein the polymer is a polymeric elastomer.

33. The method of claim 27 wherein the infiltrating step comprises applying one of heat, agitation, vacuum, and pressure to the monomer or pre-polymer mixture.

34. The method of claim 27 wherein the removing step comprises etching the microparticles using one of hydrofluoric acid, sodium hydroxide, and polymer solvents.

35. The method of claim 27 wherein the providing step comprises necking the ordered array of microparticles.

36. The method of claim 35 wherein the necking step is performed by treating the ordered array of microparticles with tetramethoxysilane vapor or silicon tetrachloride vapor.

37. The method of claim 27 wherein the ordered array of microparticles is provided on a substrate.

38. The method of claim 37 wherein the step of removing the microparticles comprises removing the substrate.

39. The method of claim 27 wherein the microparticles are selected from the group consisting of silica microspheres and polymer microspheres.

40. The method of claim 39 wherein the polymer microspheres are selected from the group consisting of polystyrene microspheres, polymethacrylate microspheres, and mixtures thereof.

41. The method of claim 27 wherein the monomer or prepolymer mixture comprises a cross-linking agent, and an initiator.

42. The method of claim 41 wherein the initiator is selected from the group consisting of a photoinitiator and a thermal initiator.

43. The method of claim 28 wherein the monomer or prepolymer mixture is a liquid, having a low vapor pressure at ambient conditions, is stable in an uncrosslinked state, and is crosslinkable.

44. The method of claim 27 wherein the monomer or prepolymer mixture comprises at least one monomer or prepolymer selected from the group consisting of methacrylic acid esters, acrylic acid esters, polyisoprene, polybutadiene, polyurethane precursors, crosslinkable polyethers, and mixtures thereof.

45. The method of claim 44 wherein the methacrylic acid ester is selected from the group consisting of ethylhexyl methacrylate, lauryl methacrylate, butyl methacrylate, methyl methacrylate, stearyl methacrylate, butoxyethyl methacrylate, and mixtures thereof.

46. The method of claim 44 wherein the acrylic acid ester is selected from the group consisting of butyl acrylate, hexyl acrylate, and mixtures thereof.

47. The method of claim 44 wherein the crosslinkable polyether is selected from the group consisting of polyether diacrylates, polyether dimethacrylates, polypropylene glycol diacrylate, polyethylene glycol diacrylate, oligoethylene glycol diacrylates, and mixtures thereof.

48. The method of claim 41 wherein the cross-linking agent is selected from the group consisting of dimethacrylates, trimethacrylates, tetramethacrylates, diacrylates, triacrylates, and tetraacrylates.

49. The method of claim 42 wherein the photoinitiator is phenylbis(2,4,6-trimethylbenzoyl)phosphine oxide.

50. The method of claim 42 wherein the thermal initiator is dicumylperoxide.

51. An authentication device comprising the photonic crystal of any one of claims 1, 4, 19, and 22.

52. The authentication device of claim 51 comprising a transparent flexible cover on the incident surface of the photonic crystal.

53. The authentication device of claim 51 for use in currency.

54. The authentication device of claim 51 for use in packaging.

55. The authentication device of claim 51 for use in identification items.

56. The authentication device of claim 51 for use in documents.

57. A method of authentication using the photonic crystal of claim 1 comprising the steps of:
provinding the photonic crystal;
compressing against the incident surface of the photonic crystal;
observing the reflectance shift from the first wavelength range to the second wavelength range.

58. The method of claim 57 further comprising the step of comparing the second wavelength range to a known wavelength range.

59. The method of claim 57 wherein the compressing step comprises applying a compression force and the second wavelength range is dependent on the compression force.

* * * * *

UNITED STATES PATENT AND TRADEMARK OFFICE
CERTIFICATE OF CORRECTION

| | | |
|---|---|---|
| PATENT NO. | : 8,676,016 B2 | Page 1 of 1 |
| APPLICATION NO. | : 12/527382 | |
| DATED | : February 4, 2014 | |
| INVENTOR(S) | : Arsenault et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
Ninth Day of June, 2015

Michelle K. Lee
*Director of the United States Patent and Trademark Office*